G. P. REED.
Regulator for Time Pieces.
No. 3,498. Reissued June 8, 1869.
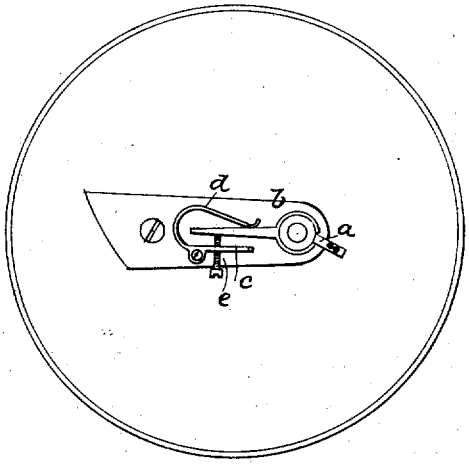
Witnesses,
Geo. R. Andrews
Samuel A. Piper
Inventor.
Geo. P. Reed
by his attorney
R. H. Eddy
N. PETERS, Photo-Lithographer, Washington, D. C.

UNITED STATES PATENT OFFICE.

GEORGE P. REED, OF BOSTON, MASSACHUSETTS.

IMPROVEMENT IN REGULATORS FOR TIME-PIECES.

Specification forming part of Letters Patent No. 61,867, dated February 5, 1867; Reissue No. 3,498, dated June 8, 1869.

*To all whom it may concern:*

Be it known that I, GEORGE P. REED, of Boston, in the county of Suffolk and Commonwealth of Massachusetts, have made an invention of a new and useful means of effecting the adjustment of regulators of time-pieces, which I term a "Micrometer;" and do hereby declare the following to be a full, clear, and exact description thereof, due reference being had to the accompanying drawing, making part of this specification, and which is a plan of my invention.

The invention comprising the subject-matter of these Letters Patent relates to means for effecting, in an expeditious, even, and positive manner, the regulation of a watch or time-piece, as now generally adopted.

The characteristic feature of my invention will be found to consist in the adoption of a spring, applied in a suitable position to act upon one side of the index lever or pointer of an ordinary watch-regulator, to force it in one direction, and against a suitable device or means applied to or in conjunction with its opposite side, to force such lever in a contrary direction, and against the power of the spring, the arrangement and action of such parts being as hereinafter referred to and explained.

In the drawing accompanying this specification, and which illustrates my invention, *a* denotes the index-lever usually applied to the hair-spring of a watch-regulator, *b* being its supporting-plate, which, in most instances, has an arc of divisions engraved upon it, though, in general, such scale is seldom referred to.

To the upper part of the supporting-plate *b*, and contiguous to one side of the longer arm of the lever *a*, a piece of metal, *c*, is secured, such piece of metal, in practice, being of about equal thickness with that of the lever.

In prolongation of the piece of metal *c*, a spring, *d*, is extended and curved about the free extremity of the longer arm of the lever, and so as to bear with considerable pressure against the opposite side thereof, the main condition necessary to be preserved in the arrangement of such part being to secure an area inclosed by the spring of sufficient size to allow of extreme vibrations of the index-lever therein.

For effecting the movements of the index-lever in opposition to the force exerted by the spring, I have shown a screw screwed through the piece of metal *c*, and against the free end of such lever, and upon its side opposite to that impinged upon by the spring *d*.

The intelligent reader will be enabled by the above description, and with the aid of the accompanying drawing, to understand at once that the spring and screw operate upon opposite sides of the index-lever, one to impel it in one direction, and the other in the contrary direction, since, as the screw, while being advanced, advances also the lever and overcomes the power of the spring, so, also, a retraction of the screw permits the power of such spring to effect a sympathetic and positive retraction or reverse movement of the lever, while it is at all times, and under all conditions, held firmly in position.

The above-described invention enables a watch-regulator to be adjusted with great rapidity, and with a degree of exactness not possible by the action of the hand alone without mechanical appliances, except by repeated trials.

One important function of the spring *d*, which might not be readily apparent except to skilled mechanics, will be found to consist in the fact that it prevents looseness or "back-lash," so called, of the threads or bearings of the screw, or of its equivalent device.

Having thus described the nature and operation of my invention, as well as its advantages, what I believe to be novel and original with myself, and desire to secure by Letters Patent of the United States, is as follows:

The adoption of a spring suitably applied to one side of the index-pointer of an ordinary watch or time-piece regulator, in combination with an adjusting-screw, or equivalent device, applied to the opposite side thereof, against which it is forced by the action of the spring, and which impels the lever in one direction against the power of the spring exerted to force it in a reverse direction, substantially as described.

GEO. P. REED.

Witnesses:

FRANK FULLER,

A. R. BOYNTON.